No. 20,314.

PATENTED MAY 25, 1858.

S. ADAMS.
DISK VALVE COCK.

THE NORRIS PETERS CO., PHOTO-LITHO., WASHINGTON. D. C.

UNITED STATES PATENT OFFICE.

SETH ADAMS, OF BOSTON, MASSACHUSETTS.

VALVE-COCK.

Specification forming part of Letters Patent No. 20,314, dated May 25, 1858; Reissued February 20, 1872, No. 4,762.

*To all whom it may concern:*

Be it known that I, SETH ADAMS, of Boston, in the county of Suffolk and State of Massachusetts, have invented an Improved Disk-Valve Cock; and I do hereby declare that the same is fully described and represented in the following specification and the accompanying drawings, of which—

Figure 1:
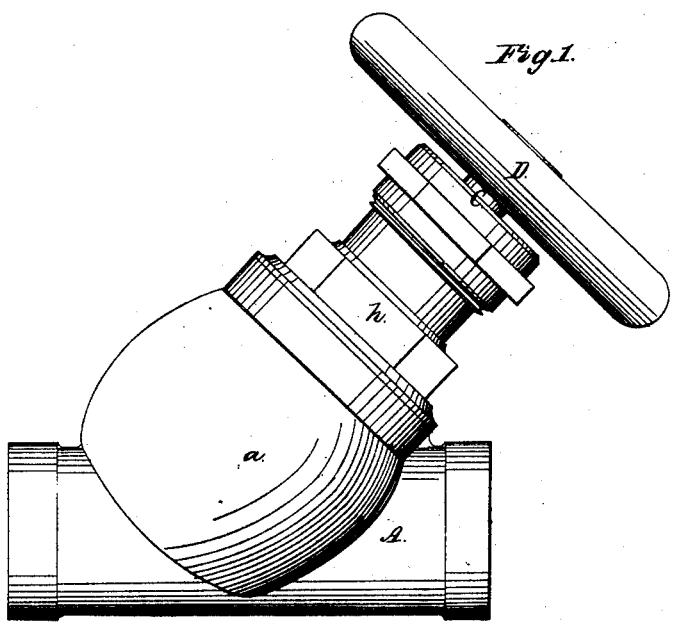
Figure 2:
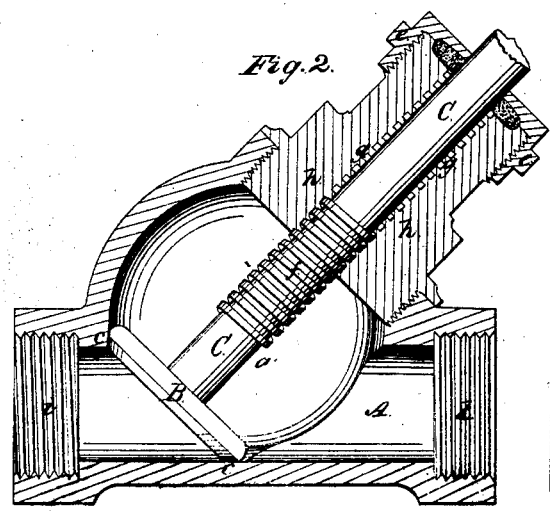
Figure 3:
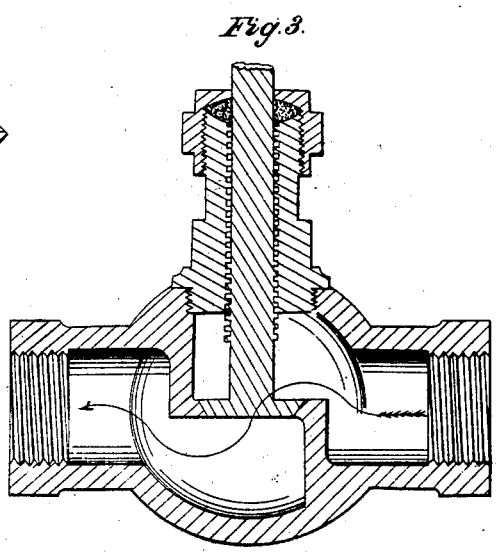

Figure 1, denotes a side view, and Fig. 2, a longitudinal section of it. Fig. 3, is a similar section of one of the kind in ordinary use and on which mine is an improvement.

The nature of my invention or improvement is to be found in a peculiar arrangement and application of a coupling pipe, a valve seat, disk valve, and valve chamber, whereby, when the valve may be raised above the bore of the coupling pipe, and a column of fluid may be passing through the coupling pipe, such column shall flow through the pipe and the valve chamber in the line of the axis of the pipe or in a straight line and enter the valve chamber at one side and pass out of its bottom, or enter at its bottom and pass out of its side, and through an opening of the valve seat, whose smallest sectional area shall not be less than the sectional area of the bore of the coupling pipe or the column of water passing through the same. In carrying out this arrangement, the axis of the coupling pipe should make an acute angle with that of the valve and its stem, and the coupling pipe should be so arranged with regard to the valve chamber as to open into the latter not only at one side of it, but at its bottom. Furthermore, the valve chamber is entirely above the bottom of the bore of the coupling pipe, and has the valve seat standing diagonally across the bore, and made of such an area with respect to the bore as not to deflect or change the column of fluid out of the line of the axis of the bore, when the column of fluid is passing through it, and the valve is raised above the bore of the pipe.

In the drawings A, denotes the coupling pipe or conduit as provided with a valve chamber, $a$, so arranged that the bore of the pipe enters the valve chamber at its bottom and passes out at one side; or enters at one side and passes out of its bottom, the valve seat, $c, c$, being arranged around the bore in a plane inclined to the axis thereof. The chamber $a$, should be made of sufficient dimensions to allow the disk valve B, to be moved therein to such a height as will carry it entirely above the bore of the coupling pipe.

The rod or stem, C, of the valve, B, extends from the middle part of the valve, and has a wheel, D, or its equivalent fixed on its outer end. The said stem which is cylindrical works through a stuffing box, $e$, and has a screw, $f$, adapted to a female screw, $g$, formed in the screw cap, $h$, of the valve chamber, $a$. On turning the wheel D, backward, the valve, B, will be raised off its seat. So by turning forward the wheel, D, the valve will be rotated and moved toward its seat.

With my improved disk valve cock, a mass of fluid, when flowing through it and the valve chamber will run in line with the axis of the pipe and suffer no material deflection or bend while passing through the valve seat. As every deflection of a current of fluid tends to increase friction and retard the flow of the current, and of course diminish the amount of delivery of the fluid, my improved disk valve cock has advantages over other kinds of disk valve cocks in which the direction of movement of the valve is perpendicular to the plane of the seat of such valve.

In constructing disk valves, and applying them to tubes for the conveyance of water or steam, it has generally been customary to arrange them so that they shall have the plane of their seats either parallel to or in line with the axis of the tube, the water or steam, as the case may be, when passing through the valve chamber and opening of the seat being made to bend twice or be subjected to two flexures. In Fig. 3, is exhibited a sectional view of one of this last mentioned kind of valve cocks, the arrows in such figure serving to illustrate the course of the fluid in passing through the valve chamber.

I am aware that a sliding, as well as, a conical gate has been applied within a pipe and so as to move in a chamber at right angles to the direction of the axis of the pipe. My invention is an improvement on a very different kind of water cock, viz., one in which the valve is a disk valve and is rotated with its stem and also moved in a direction at a right angle to its seat. Besides this, each end of the coupling pipe, A, of my stop cock is furnished with a coupling screw $i$, or $k$, having their threads so arranged that on revolving the whole cock in one direction, it may be either connected or screwed to two leading pipes, or it may be disconnected or unscrewed therefrom. I am also fully aware of the stopcocks described and represented in the specification and drawings of Horatio Allen's application for a patent withdrawn in July, 1843, particularly that shown in Fig. 3, of such drawings. My invention differs materially from either of the stop cocks of the said Allen, for in them, the axes of induction and eduction passages are so disposed with respect to the valve chamber, that the fluid in passing through said chamber is caused to bend at a right angle. In the stop cock described in Fig. 3, of the said Allen's drawing, in passing from one leading pipe to the other, the fluid would have to make three flexures. Besides this, the valves shown in Figs. 1, and 3, of the said Allen's drawings are cylinders.

It is the direction of the axes of injet and outjet that determine the directions in which the water or fluid may flow through the valve chamber, although in Allen's stop cock (Fig. 3,) both the leading pipes, at short distances from the valve chamber are in a line with one another, yet, where they are connected with the said chamber, each is bent upward in such manner as to make the axes of injet and outjet of the chamber at a right angle to one another. From this it is plain to be seen, that when water or fluid is flowing in the straight part of one pipe into the straight portion of the other, it must suffer three angular flexures, it being made to turn at a right angle while passing through the valve chamber. Consequently, it is plain, that such a stop cock differs materially from my improved stop cock, the axes of whose injet and outjet are in one straight line, and arranged so that water or fluid in passing through the valve chamber, shall flow freely in a line of such axes of injet and outjet.

I do not claim any of the stop cocks to which I have had occasion to refer in the explanation of the difference between them and my improved disk valve cock, but what I do claim is an improvement upon them, or in other words, I claim—

My improved disk valve cock made substantially as described, viz., with one coupling pipe, a valve seat, disk valve, and valve chamber arranged and applied together essentially as specified, so that when the valve may be raised above the bore of the coupling pipe, and a column of fluid may be passing through the said pipe such column shall flow through the pipe and valve chamber in a line with the axes of the pipe or in a straight line and enter the valve chamber at one side and pass out of its bottom, or enter at its bottom and pass out of its side and through an opening of the valve seat, whose sectional area shall be equal to or greater than that of the bore of the coupling pipe.

In testimony whereof I have hereunto set my signature this 9th day of March, 1858.

SETH ADAMS.

Witnesses:
 R. H. EDDY,
 F. P. HALE, Jr.

[FIRST PRINTED 1911.]